United States Patent [19]

Sugimoto

[11] Patent Number: 4,485,986
[45] Date of Patent: Dec. 4, 1984

[54] EMERGENCY LOCKING RETRACTOR FOR A SEAT BELT ASSEMBLY

[75] Inventor: Mutsumi Sugimoto, Hamamatsu, Japan

[73] Assignee: Katsuyama Kinzoku Kogyo Kabushiki Kaisha, Hamamatsu, Japan

[21] Appl. No.: 460,359

[22] Filed: Jan. 24, 1983

[30] Foreign Application Priority Data

Jan. 28, 1982 [JP] Japan .................................. 57-12144
Mar. 10, 1982 [JP] Japan .................................. 57-37486

[51] Int. Cl.³ ........................ A62B 35/02; B65H 75/48
[52] U.S. Cl. ........................ 242/107.4 A; 242/107.4 B
[58] Field of Search ................ 242/107.4 A, 107.4 B; 280/806; 297/478, 480

[56] References Cited

U.S. PATENT DOCUMENTS

4,036,322  7/1977  Takada ..................... 242/107.4 B X
4,393,995  7/1983  Tukamoto .................... 242/107.4 A

Primary Examiner—John M. Jillions
Attorney, Agent, or Firm—Robert E. Burns; Emmanuel J. Lobato; Bruce L. Adams

[57] ABSTRACT

A retractor sensitive both to a rate of webbing withdrawal and to vehicle acceleration is disclosed. A reel for paying off and winding up the webbing is fixedly mounted on a rotary shaft sprung in a direction of webbing retraction. Mounted on an extension of the reel shaft is a locking mechanism including a locking ring which is cammed axially of the reel shaft extension for locking and unlocking the reel. A webbing sensor mechanism comprises a cam disc rotatably mounted on the reel shaft extension and normally engaged with the locking ring for joint rotation therewith, and an inertia member in the form of a heavy ratchet wheel also rotatably mounted on the reel shaft extension. The cam disc has eccentrically pivoted thereon a curved sensor arm which, upon rapid webbing extension, is pivoted by the ratchet wheel into engagement with one of ratchet teeth formed internally on a fixed housing. Thus set out of rotation, the cam disc causes the locking ring to lock the reel against rotation in the direction of webbing extension. A vehicle sensor mechanism includes a pawl capable of engaging the ratchet wheel in the event of excessive vehicle acceleration. On engagement with the pawl the ratchet wheel causes the sensor arm to arrest the rotation of the cam disc, again resulting in the lockup of the retractor.

15 Claims, 21 Drawing Figures

EMERGENCY LOCKING RETRACTOR FOR A SEAT BELT ASSEMBLY

BACKGROUND OF THE INVENTION

The present invention relates in general to a retractor for a seat belt assembly for use on motor vehicles, and more specifically to a seat belt retractor of the emergency locking type. The emergency locking retractor according to the invention responds to rapid extension of a webbing or strap, although it admits of ready adaptation for response to the acceleration or deceleration of the vehicle or the like as well.

Emergency locking retractors have been known and used extensively for vehicular seat belt assemblies. They incorporate a locking mechanism that is activated by vehicle accleration, webbing movement relative to the vehicle, or other automatic action during an emergency. When the vehicle is at a standstill, or travelling at accelerations of, say, not more than 0.3 G, the emergency locking retractor should allow the webbing or strap to be extended and retracted freely as required by the bodily movement of the wearer. In the event of rapid braking, collision, rollover, or other abnormal conditions of the vehicle, the retractor should immediately lock up to prevent any further extension of the webbing for the safety of the user.

Being installed in narrowly confined spaces within motor vehicles, the emergency locking retractors should be of minimal dimensions. They should nonetheless be positive, reliable and fast-acting in operation and trouble-free in construction.

There has been another problem seriously affecting the utility of known emergency locking retractors of the type sensitive to webbing movement relative to the vehicle. Upon full retraction of the webbing, by the force of a spring acting on the webbing reel, the webbing sensor of some conventional retractors has been prone to activate the locking mechanism accidentally. This makes impossible, or at least difficult, the ready re-extension of the webbing.

SUMMARY OF THE INVENTION

This invention seeks to provide an emergency locking seat-belt retractor of the type sensitive at least to webbing movement relative to the vehicle or the like in which it is installed. The invention also seeks to make the retractor extremely compact in size, positive and quick-acting in operation, and trouble-free and economical in construction. Further the invention seeks to prevent the undesired lockup of the retractor during, and at the end of, the retraction of the webbing.

In the emergency locking retractor according to the invention, stated in brief, a reel for paying off and winding up webbing or strap is fixedly mounted as usual on a shaft which is rotatably supported by a frame and which is biased in a direction to cause retraction of the webbing. The emergency locking retractor broadly comprises a locking mechanism and a webbing sensor mechanism, both provided to an extension of the shaft rigidly carrying the reel. The locking mechanism comprises a cogwheel fixedly mounted on the shaft extension, and a locking ring concentrically surrounding the shaft extension and connected via first resilient means to the cogwheel for joint rotation therewith, the first resilient means biasing the locking ring away from the cogwheel. The locking ring has cam follower means for axial movement toward and away from the cogwheel and is adapted to lock the cogwheel, and therefore the reel, against rotation relative to the frame when cammed toward the cogwheel against the bias of the first resilient means.

The webbing sensor mechanism, on the other hand, includes a cam disc rotatably mounted on the shaft extension and operatively engaged with the cam follower means of the locking ring for joint rotation therewith. When restrained from rotation in a direction of the webbing extension, by means hereinafter set forth, the cam disc causes the locking ring to travel axially toward the cogwheel against the bias of the first resilient means for arresting the rotation of the reel. Mounted eccentrically on one face of the cam disc is a curved sensor arm swingable about its medial pivot between a retracted and a working position. The sensor arm normally lies in the retracted position under the force of second resilient means and pivots to the working position upon exertion of a force on its first end tending to arrest the revolution of the sensor arm with the cam disc in the direction of the webbing extension. In the working position of the sensor arm, a pawl at its second end projects beyond the circumference of the cam disc into positive engagement with a series of internal ratchet teeth on an annular member mounted in fixed relation to the frame, resulting in the locking of the cam disc, and therefore of the reel, against rotation in the direction of webbing extension. Adapted for pivoting the sensor arm from the retracted to the working position upon rapid extension of the webbing is an inertia member which is rotatably mounted on the shaft extension and which is operatively engaged with at least the first end of the sensor arm so as to be free to rotate relative to the sensor arm and the disc cam within limits. The inertia member has a greater mass than the combined mass of the disc cam and the sensor arm, so that upon rapid rotation of the reel due to webbing extension in an emergency, the inertia member lags behind the cam disc and so acts on the first end of the sensor arm to cause same to pivot from the retracted to the working position.

Perhaps the most pronounced feature of the emergency locking retractor outlined above is the curved sensor arm pivotally mounted in an eccentric position on the cam disc for arresting its rotation in the event of an emergency. The sensor arm can be easily molded from rigid plastics material, contributing materially to the simplified construction, reliable operation, and reduced manufacturing cost of the overall retractor.

A further important feature of the invention resides in a lockup prevention mechanism for maintaining the sensor arm in the retracted position during, and at the end of, the retraction of the webbing in order to make possible the smooth re-extension of the webbing. Despite its simplicity the lockup prevention mechanism greatly enhances the practical utility of the retractor.

In a preferred embodiment the retractor further comprises a vehicle sensor mechanism for locking the reel against rotation in the direction of webbing extension in response to an undue acceleration or deceleration of the vehicle. In this embodiment the inertia member of the webbing sensor mechanism takes the form of a ratchet wheel, and the vehicle sensor mechanism engages and sets this ratchet wheel out of rotation in the direction of webbing extension upon undue vehicle acceleration.

The above and other features and advantages of this invention and the manner of attaining them will become

DESCRIPTION OF THE PREFERRED EMBODIMENTS

General

Figure 1:
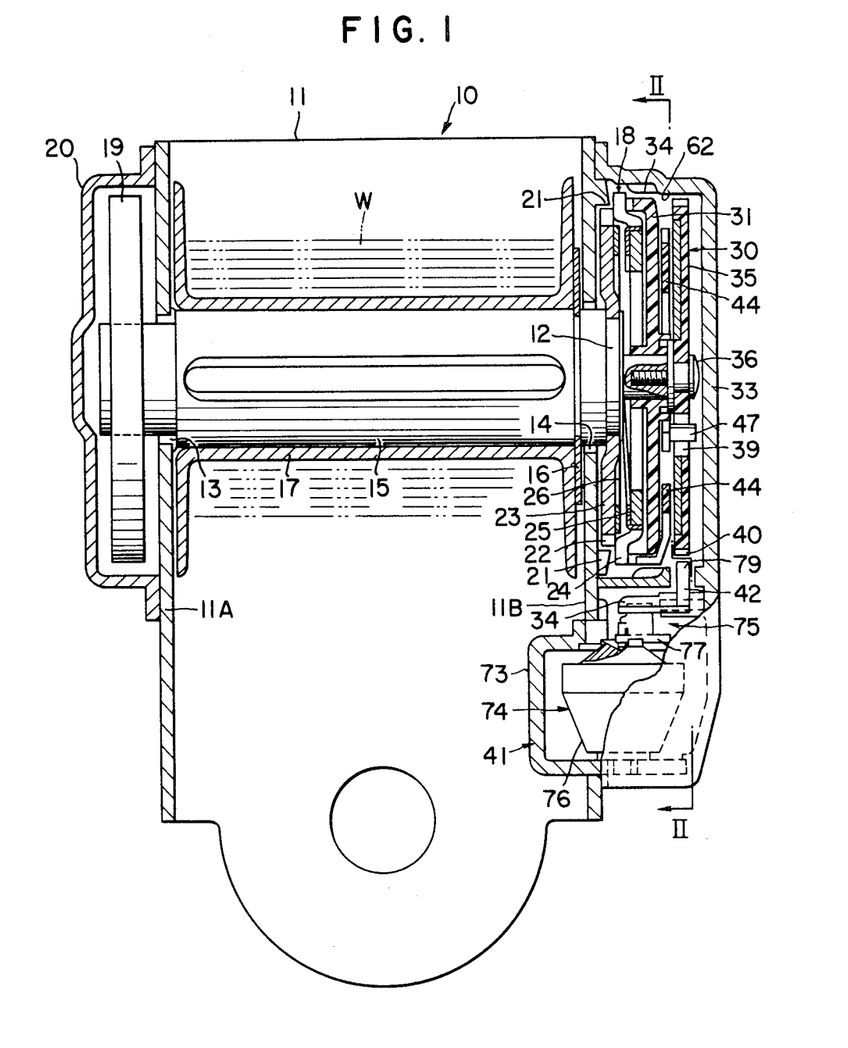
FIG. 1 is an axial section through the emergency locking retractor constructed in accordance with the principles of this invention.
Figure 2:
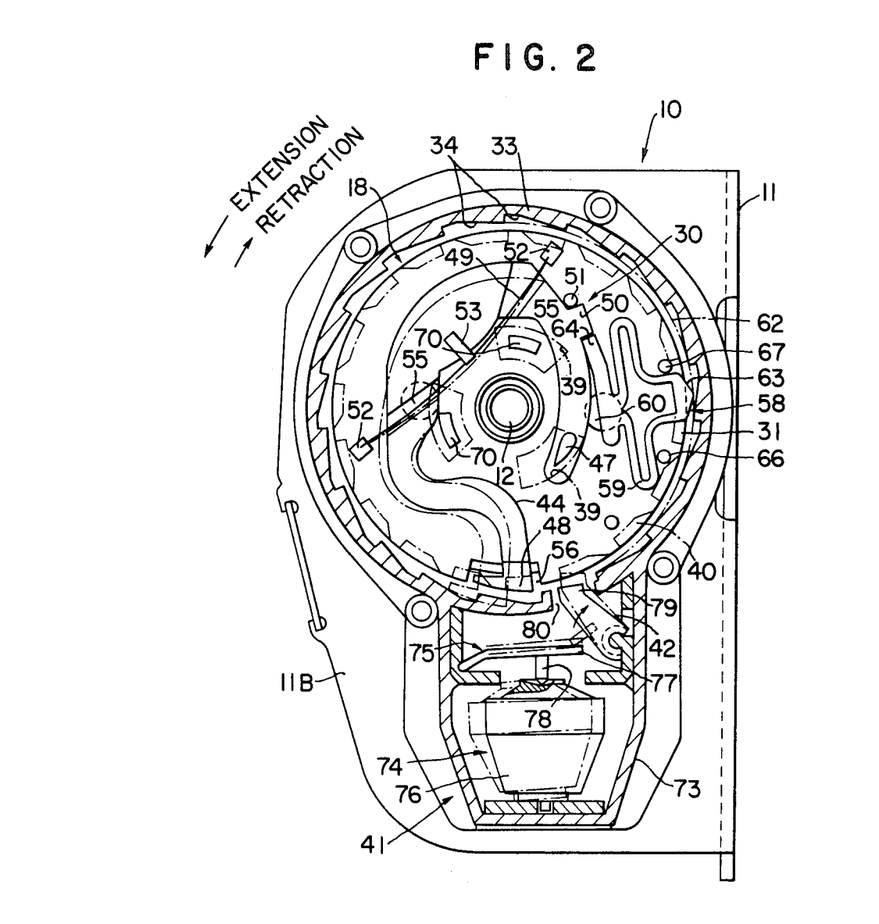
FIG. 2 is a cross section through the emergency locking retractor, taken along the line II—II of FIG. 1.
Figure 3:
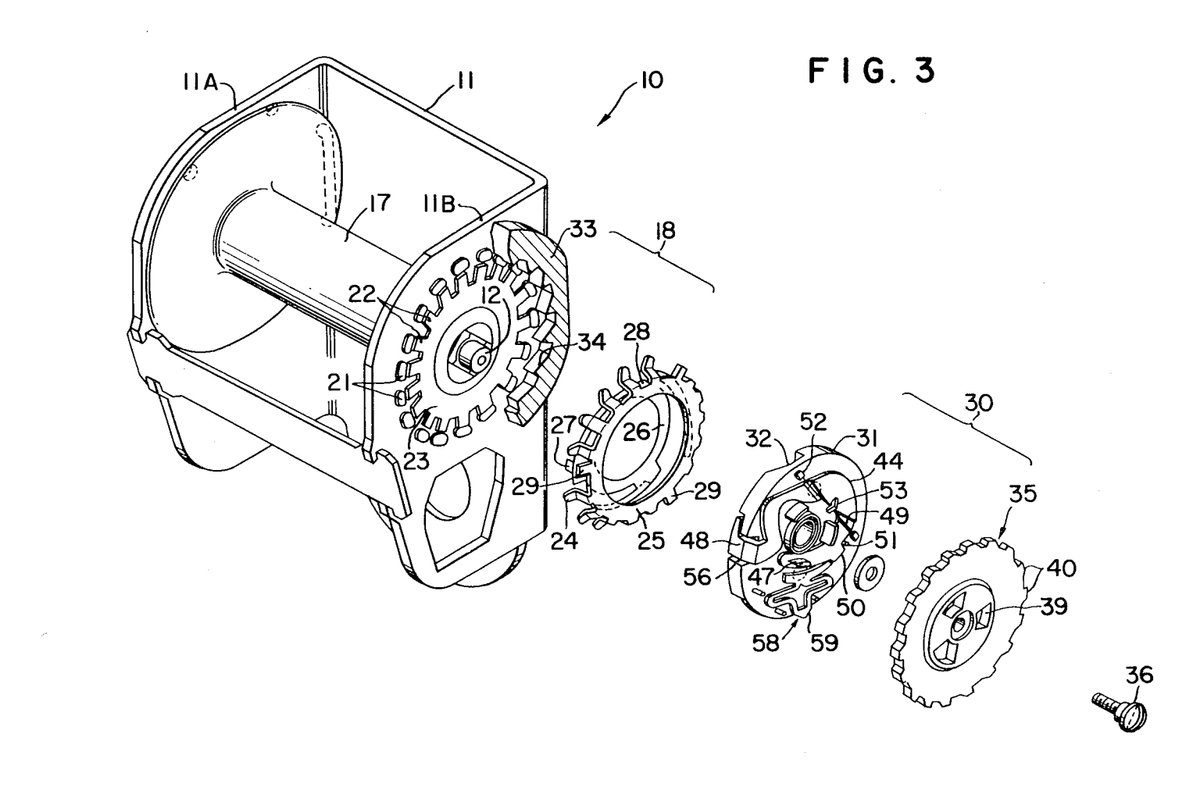
FIG. 3 is an exploded perspective view of the emergency locking retractor, the view showing in particular the locking mechanism and webbing sensor mechanism of the retractor and not showing the vehicle sensor mechanism.
Figure 4:
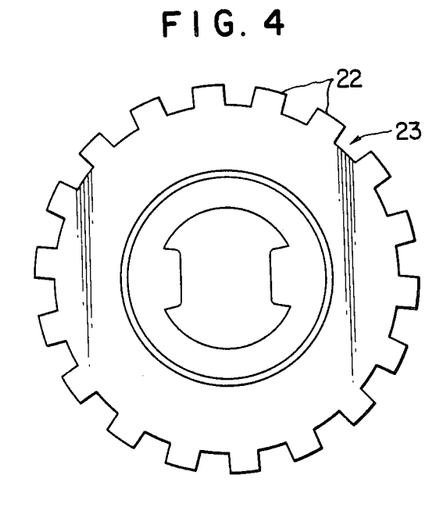
FIG. 4 is a detail view of the cogwheel in the locking mechanism of the retractor.

FIGS. 1 through 11 of the above drawings illustrate the emergency locking retractor of this invention as adapted for a vehicular seat belt assembly, and for response both to vehicle acceleration (inclusive of deceleration) and to webbing movement relative to the vehicle. Generally referenced 10 in FIGS. 1, 2 and 3, the emergency locking retractor broadly comprises:

1. A flanged reel 17 fixedly mounted on a rotary shaft 15 supported by a frame 11 of U-shaped cross section for paying off and winding up webbing or strap W.
2. A locking mechanism 18 for locking the reel 17 against rotation in the event of an emergency.
3. A webbing sensor mechanism 30 for activating the locking mechanism 18 upon withdrawal or extension of the webbing W at a rate in excess of a predetermined limit.
4. A lockup prevention mechanism 58 for preventing the webbing sensor mechanism 30 from activating the locking mechanism 18 during, and at the end of, the retraction of the webbing W.
5. A vehicle sensor mechanism 41 for activating the locking mechanism 18 in response to vehicle acceleration in excess of a predetermined limit.

As shown in FIG. 1, the webbing W is wound on and unwound from the reel 17 and has one end firmly anchored thereto in a conventional manner. The shaft 15 rigidly carrying the reel 17, hereinafter referred to as the reel shaft, has its opposite ends rotatably journaled in sleeve bearings 13 and 14 mounted to a pair of opposed sidewalls 11A and 11B of the frame 11. A stop ring 16 on one end of the reel shaft 15 restrains its axial displacement relative to the frame 11.

The left hand end journal, as seen in FIG. 1, of the reel shaft 15 projects beyond the left hand sidewall 11A of the frame and is connected to one end of a spiral spring 19. A spring housing 20 enclosing the spiral spring 19 supports the other end of this spring, with the result that the reel shaft 15 is biased in a direction to cause retraction of the webbing W.

The right hand end journal of the reel shaft, on the other hand, has a stepped extension 12 projecting beyond the right hand sidewall of the frame 11. The noted locking mechanism 18 and webbing sensor mechanism 30 are both mounted on, or structurally associated with, this stepped extension of the reel shaft and are altogether accommodated in a sensor housing 33 of metal or rigid plastic material rigidly fastened to the frame 11. The sensor housing 33 is of generally tubular shape, concentric with the reel shaft extension 12, and is closed at one end and open at the other, with the open end secured to the sidewall. The sensor housing also forms a part of the webbing sensor mechanism 30, as will become apparent as the description proceeds.

Locking Mechanism

With reference to FIGS. 1 and 3 the locking mechanism 18 comprises:

1. A set of teeth 21 formed in annular arrangement on the outer surface of the sidewall of the frame 11 and centered about the axis of the reel shaft extension 12.
2. A cogwheel 23 fixedly mounted on the reel shaft extension 12 and having formed on its periphery a set of teeth or cogs 22 capable of radial alignment with the teeth 21 on the frame 11.
3. A locking ring 25 disposed concentrically around the reel shaft extension 12, on the outside of the cogwheel 23, and having formed on its periphery a set of locking teeth 24 capable of simultaneous engagement with the teeth 21 on the frame 11 and with the teeth 22 on the cogwheel 23.

4. An annular spring 26 connected between the cogwheel 23 and the locking ring 25 and yieldably urging the latter away from the former to normally maintain the locking teeth 24 out of engagement with the teeth 21 and 22.

To facilitate description, the teeth 21 on the frame 11 will hereinafter be referred to as the stationary teeth, and the teeth 22 on the cogwheel 23 as the rotary teeth. The stationary teeth 21 are substantially square-shaped, as shown in FIG. 3. The rotary teeth 22, disposed radially inwardly of the stationary teeth 21, are also square-shaped, as seen in FIG. 3 and more clearly in FIG. 4.

Figure 5A:
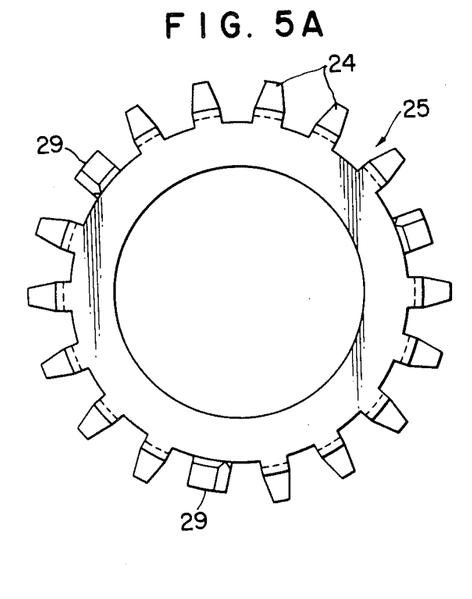
FIG. 5A is a detail view of the locking ring in the locking mechanism of the retractor.
Figure 5B:
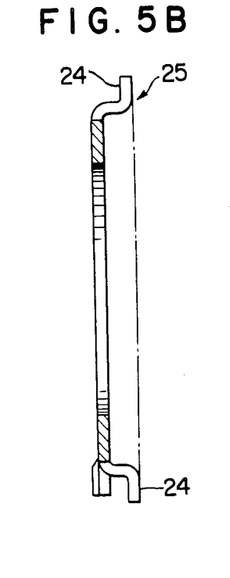
FIG. 5B is an axial section through the locking ring.
Figure 6:
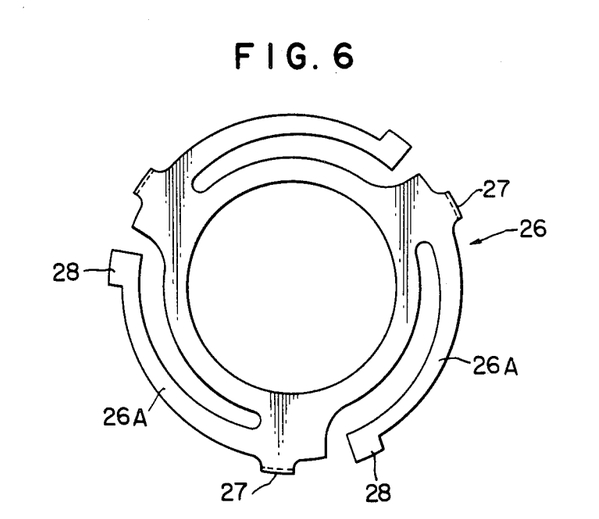
FIG. 6 is a detail view of the annular spring in the locking mechanism of the retractor.

The locking ring 25 is shown in greater detail in FIGS. 5A and 5B. The locking teeth 24 on this locking ring are each bent dually, first toward the cogwheel 23 and then radially outwardly. The radially outwardly extending portions of the locking teeth 24 are intended to engage with the stationary teeth 21 and the rotary teeth 22, resulting in the locking of the cogwheel 23, and therefore of the reel 17, against rotation. Also formed on the locking ring 25 are a plurality of, three in the illustrated embodiment, cam follower lugs 29 extending radially outwardly from its periphery at constant angular spacings. By these cam follower lugs the locking ring 25 is to be cam operated from the webbing sensor mechanism 30 for axial movement toward the cogwheel 23 against the force of the annular spring 26, as will be later explained in more detail.

Interposed between the cogwheel 23 and the locking ring 25, the annular spring 26 serves the dual purpose of imparting the rotation of the cogwheel to the locking ring and of biasing the locking ring away from the cogwheel. As illustrated on an enlarged scale in FIG. 6, the annular spring 26 has a plurality of bent lugs 27 for positive engagement with the rotary teeth 22 on the cogwheel 23. It will also be noted that the annular spring is shown to have three spring arms 26A each terminating in a lug 28 which may either extend radially outwardly or bent toward the locking ring 25. The terminal lugs 28 of the spring arms make positive engagement with the locking teeth 24 on the locking ring 25. Thus the spring 26 accomplishes the dual objective set forth previously.

Webbing Sensor Mechanism

With reference back to FIGS. 1, 2 and 3 the webbing sensor mechanism 30 comprises:

1. A cam disc 31 rotatably mounted on the reel shaft extension 12, while being restrained from axial displacement, and normally engaged with the cam follower lugs 29 on the locking ring 25 for joint rotation therewith, the cam disc being operative, when locked against rotation relative to the reel shaft extension in a direction of webbing extension (indicated by the arrow in FIG. 2), to cause the locking ring to travel axially toward the cogwheel 23 for arresting the rotation of the reel 17.
2. A sensor arm 44 pivoted eccentrically on the outer face of the cam disc 31 for movement between a retracted position (indicated by the solid lines in FIG. 2) and a working position (indicated by the dot-and-dash lines in FIG. 2), the sensor arm when pivoted to the working position engaging one of a set of internal ratchet wheel 34 on the sensor housing 33 for preventing the rotation of the cam disc 31 in the direction of webbing extension.
3. An inertia member 35 rotatably mounted on the reel shaft extension 12, while being also restrained from axial displacement, and operatively engaged with at least the sensor arm 44 (preferably with the cam disc 31 as well) for causing the sensor arm to pivot from the retracted to the working position upon rapid extension of the webbing W.

Figures 7A, 7B:
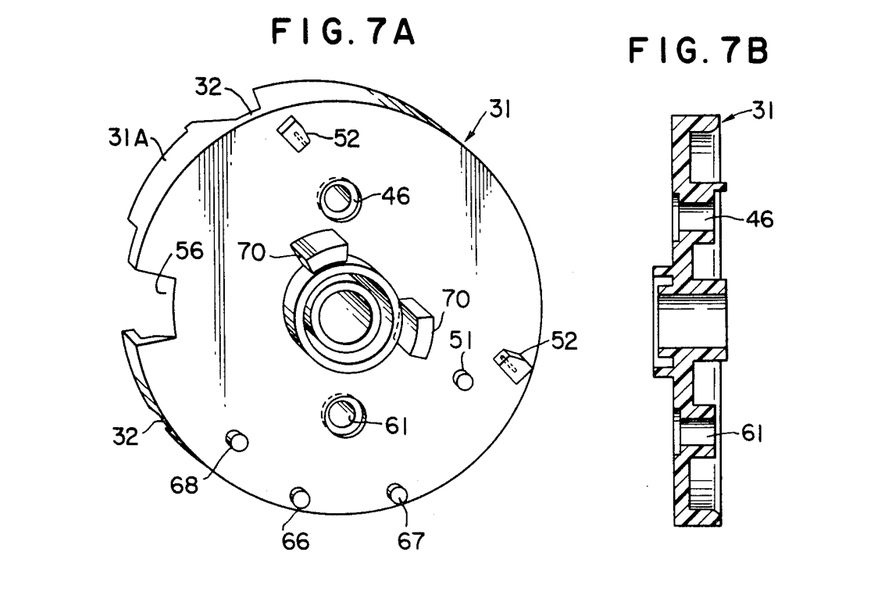
FIG. 7A is a perspective view of the cam disc in the webbing sensor mechanism of the retractor.
FIG. 7B is an axial section through the cam disc of FIG. 7A.

FIGS. 7A and 7B are detailed representations of the cam disc 31. Molded from rigid plastic or like lightweight material, the cam disc 31 has an annular rim 31A on its periphery which is directed toward the locking ring 25. This rim of the cam disc has formed therein three notches 32 for engagement with the respective cam follower lugs 29 on the locking ring 25. One side of each notch 32 is parallel to the axis of the cam disc whereas the other is inclined. Normally engaged in the deepest parts of the notches 32 under the bias of the annular spring 26, the cam follower lugs 29 serve to transmit the rotation of the locking ring 25 to the cam disc 31. Also, when the cam follower lugs are engaged in the deepest parts of the notches, the locking ring 25 has its locking teeth 24 out of engagement with the stationary teeth 21 on the frame 11 and the rotary teeth 22 on the cogwheel 23, thus allowing the free rotation of the reel 17 in either direction.

The cam disc 31 is to be set out of rotation as the inertia member 35 causes the sensor arm 44 to pivot from the retracted to the working position and hence to engage one of the internal ratchet teeth 34 on the sensor housing 33 during webbing extension. Thereupon the cam follower lugs 29 on the locking ring 25 slide over the sloping sides of the notches 32 in the cam disc 31 thereby causing the axial travel of the locking ring toward the cogwheel. Then, as the locking teeth 21 on the locking ring engage the stationary teeth 21 and rotary teeth 22, the reel 17 becomes held against rotation.

Figure 8A:
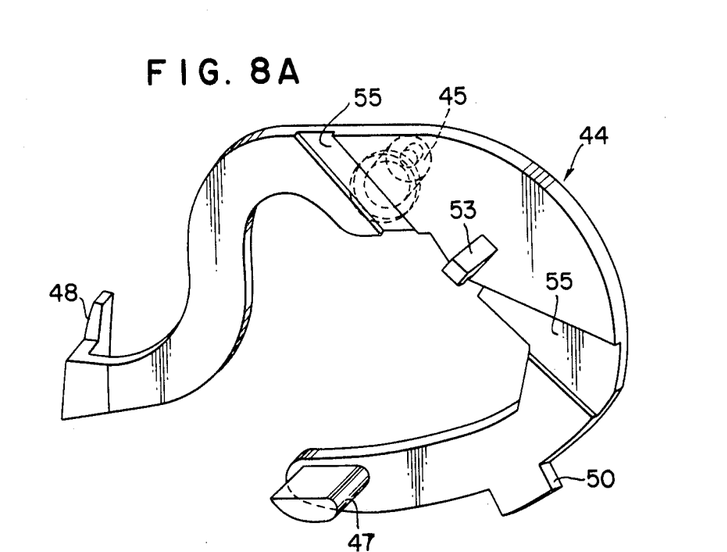
FIG. 8A is an enlarged perspective view of the sensor arm in the webbing sensor mechanism of the retractor.
Figure 8B:
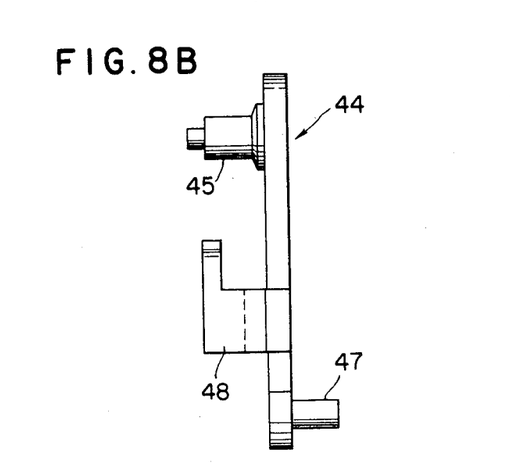
FIG. 8B is a left hand side elevation of the sensor arm of FIG. 8A.

FIGS. 8A and 8B illustrate in detail the sensor arm 44 pivoted eccentrically on the cam disc 31. The sensor arm together with its appendages hereinafter set forth can be an integral molding of a fiber-reinforced plastic such as nylon 66 containing glass fibers. Curved as best seen in FIGS. 2 and 8A, the sensor arm 44 has a pivot pin 45 which is located intermediate its opposite ends and which is rotatably received in a countersunk hole 46, FIGS. 7A and 7B, created eccentrically in the cam disc 31. The sensor arm is therefore pivotable in a plane parallel to the cam disc 31.

A projection 47 is formed on one end of the sensor arm 44 and extends toward the inertia member 35 for engagement therewith in a manner yet to be described. The other end of the sensor arm has an L-shaped pawl 48 bent right-angularly therefrom toward the cam disc 31. The pawl 48 engages one of the internal ratchet teeth 34 on the sensor housing 44 when the sensor arm 44 is pivoted to the phantom working position of FIG. 2.

Normally, however, the sensor arm 44 is held in the solid-line retracted position by resilient means herein shown as a linear spring 49, FIGS. 2 and 3, which is supported at both ends by a pair of spring retainers 52 on the cam disc 31 and which is engaged at its midpoint with a projection 53 on the sensor arm. The linear spring 49 energizes the sensor arm 44 in a counterclockwise direction, as viewed in FIG. 2, about its pivot 45 until a tongue 50 on the sensor arm comes into abutment against a stop pin 51 on the cam disc 31. The sensor arm 44 is grooved at 55 to receive parts of the linear spring 49, providing a space sufficient for its required deflection. When the sensor arm 44 is in the retracted position as above, its pawl 48 is received in a peripheral indentation 56 in the cam disc 31 and so is held out of engagement with the internal ratchet teeth 34 on the sensor housing 33.

Figure 9A:
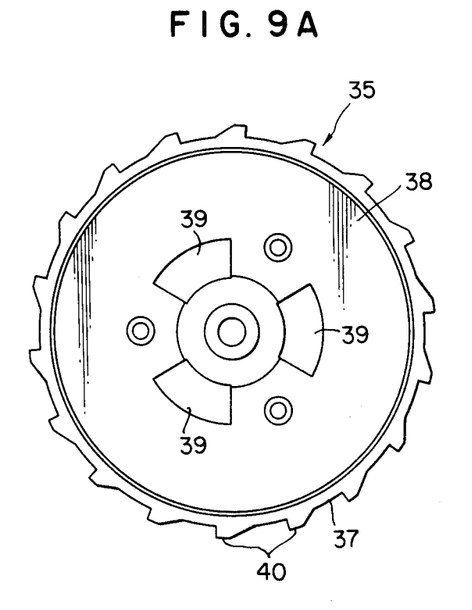
FIG. 9A is a detail view of the inertia member or ratchet wheel in the webbing sensor mechanism of the retractor.
Figure 9B:
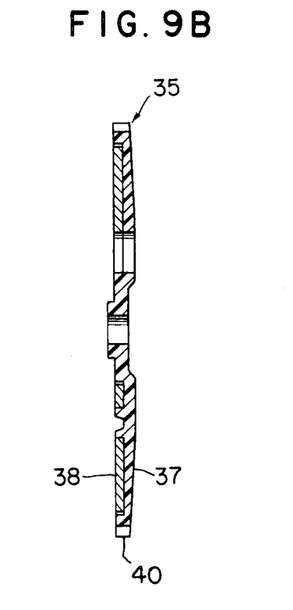
FIG. 9B is an axial section through the inertia member of FIG. 9A.

Reference is now directed to FIGS. 9A and 9B in order to explain the inertia member 35. It will be noted that the inertia member in this particular embodiment takes the form of a ratchet wheel, having ratchet teeth 40 on its periphery. This is because the illustrated embodiment additionally incorporates the vehicle sensor mechanism 41 seen in FIGS. 1 and 2. The vehicle sensor mechanism acts on the inertia member 35, locking same against rotation in the direction of webbing extension upon undue vehicle acceleration, as will be detailed subsequently. Accordingly, in retractors constructed in accordance with the invention but without the vehicle sensor mechanism, the inertia member need not be in the form of a ratchet wheel.

It is essential, however that regardless of the form it takes in practice, the inertia member 35 have a mass sufficiently more than the combined mass of the disc cam 31, the sensor arm and other parts mounted on the disc cam. To this end the inertia member has a steel backing 38 embedded in a plastic ratchet-toothed disc 37 in this particular embodiment.

The inertia member 35 of the above construction is loosely mounted on the reel shaft extension 12 and restrained from axial displacement by a headed screw 36 as in FIG. 1. This screw is further adapted to prevent axial displacement of the cam disc 31 to the right as viewed in FIG. 1.

FIGS. 9A and 9B also reveal three arcuate slots 39 formed annularly in the inertia member 35, all centered about the axis of the reel shaft extension 12. One of these arcuate slots loosely receives the projection 47 on the sensor arm 44 whereas the other two loosely receive similar projections 70 on the outer face of the cam disc 31. Consequently the inertia member 35 is free to rotate relative to the cam disc 31 and the sensor arm 44 within limits. The direct engagement of the inertia member 35 with the cam disc 31, as above, is not essential but is preferred to protect the sensor arm 44 against overloading by the inertia member.

It will now be clear that the inertia member 35 normally rotates with the cam disc 31 in either direction. Upon rapid extension of the webbing W, however, the inertia member lags behind the cam disc owing to the difference in mass therebetween and so causes the sensor arm 44 to pivot from the retracted to the working position, as in FIG. 2, in opposition to the force of the linear spring 49. The result is the lockup of the retractor by the locking mechanism 18.

Lockup Prevention Mechanism

The illustrated embodiment further features the lockup prevention mechanism 58, FIGS. 2 and 3, for maintaining the sensor arm 44 in the retracted position at the time of the retraction of the webbing. When released by the wearer, the webbing is wound back quickly onto the reel 17 by the force of the spiral spring 19 of FIG. 1. Were it not for the lockup prevention mechanism, the sensor arm 44 of the webbing sensor mechanism 30 might be thrown into positive engagement with the internal ratchet teeth 34 on the sensor housing 33 despite the force of the spring 49. Then the retractor would lock up, making impossible the ready re-extension of the webbing.

Figure 10A:
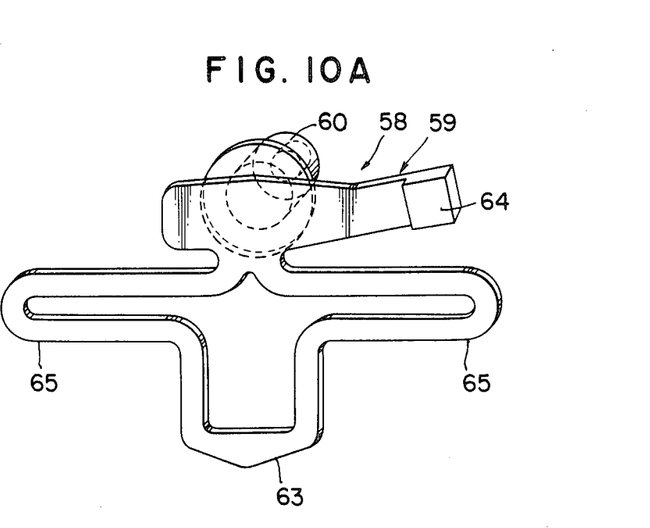
FIG. 10A is an enlarged perspective view of the lockup preventer in the lockup prevention mechanism of the retractor.
Figure 10B:
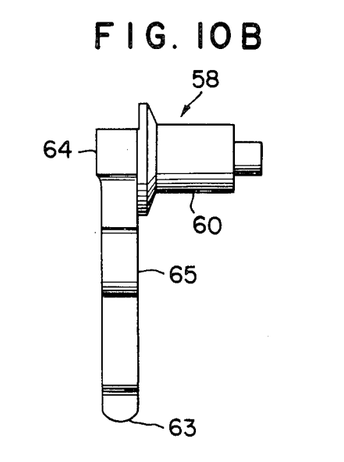
FIG. 10B is a right hand side elevation of the lockup preventer of FIG. 10A.

The lockup prevention mechanism 58 includes a lockup preventer 59 shown in FIGS. 2 and 3 and on an enlarged scale in FIGS. 10A and 10B. Fabricated from metal or rigid plastic material, the lockup preventer 59 has an integral pivot pin 60 which is rotatably engaged in a countersunk hole 61, FIGS. 7A and 7B, formed eccentrically in the cam disc 31. As indicated in FIG. 10A, the lockup preventer 59 has a tip 63 capable of sliding engagement with a blank inside surface portion 62, FIGS. 1 and 2, of the sensor housing 33, and an arm 64 with a thickened end for positive engagement with the tongue 50 of the sensor arm 44. The lockup preventer is further formed to include a pair of opposed U-shaped spring portions 65 located between the pivot pin 60 and the tip 63, thereby to be self-biased to have the tip urged against the blank inside surface portion 62 of the sensor housing.

For limiting the pivotal movement of the lockup preventer 59 into and out of engagement with the sensor arm 44, a pair of stop pins 66 and 67 are formed on the outer surface of the cam disc 31 as in FIGS. 2 and 7A. The latter figure also reveals a spacer pin 68 on the cam disc 31 for maintaining between cam disc 31 and inertia member 35 a spacing required for the proper pivotal movement of the lockup preventer 59. To this end the spacer pin 68 is made longer than the other pins 51, 66 and 67 on the cam disc 31.

During the retraction of the webbing W the cam disc 31 together with the sensor arm 44 and lockup preventer 59 thereon rotates clockwise, as seen in FIG. 2, by the force of the spiral spring 19. Having its tip 63 sprung into sliding contact with the blank inside surface portion 62 of the sensor housing 33, the lockup preventer 59 is frictionally pivoted counterclockwise about its pivot 60 into abutment against the stop pin 67. In this position the lockup preventer has its arm 64 in positive engagement with the tongue 50 of the sensor arm 54. Thus is the sensor arm firmly maintained in the retracted position during, and at the end of, webbing retraction. The inertia member 35 rotates in the same direction as the cam disc 31 during webbing retraction by directly engaging the projections 70 on the cam disc.

During the extension of the webbing W, on the other hand, the cam disc 31 rotates counterclockwise, so that the lockup preventer 59 is pivoted into abutment against the other stop pin 66 as its tip 63 slides over the blank inside surface portion 62 of the sensor housing. Now the arm 64 of the lockup preventer is out of engagement with the sensor arm tongue 50. The sensor arm is held in the retracted position solely under the bias of the linear spring 49, free to pivot to the working position in opposition to the spring force whenever relatively acted upon by the inertia member 35 in engagement with the projection 47 on the sensor arm.

Vehicle Sensor Mechanism

Figure 11:
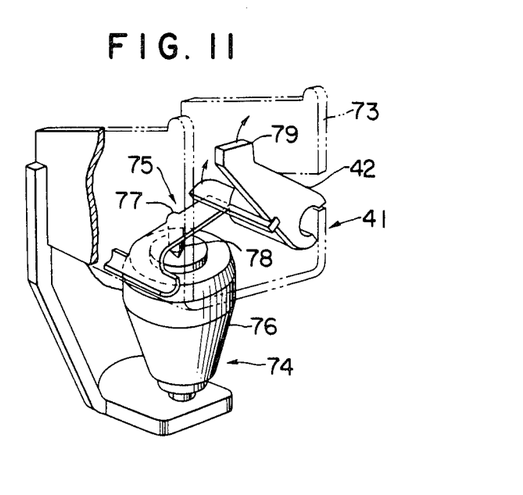
FIG. 11 is a perspective view, with a part shown broken away to reveal other parts, of the vehicle sensor mechanism of the retractor.

The vehicle sensor mechanism 41 is shown in elevations in FIGS. 1 and 2 and in perspective in FIG. 11. Housed in an enclosure 73 formed integral with and disposed under the sensor housing 33, the vehicle sensor mechanism 41 comprises an inertia sensor 74 and a linkage 75, the latter being adapted to engage the ratchet teeth 40 on the inertia member 35 of the webbing sensor mechanism 30 on actuation by the inertia sensor. The inertia sensor 74 has a sensor weight 76 in the form of a cylinder, partly tapered, placed upstandingly on the bottom of the vehicle sensor enclosure 73 so as to be free to pivot on its bottom in any direction.

The linkage 75 of the vehicle sensor mechanism includes a pickup pin 78 depending from a first lever 77 and having a pointed tip engaged in a conical depression created centrally in the top of the sensor weight 76. The first lever 77 has one of its ends pivotally mounted to the vehicle sensor enclosure 73, and the other, free end of the first lever is operatively engaged with a second lever 42. This second lever also has one of its ends pivotally mounted to the vehicle sensor enclosure 73. Projecting into the sensor housing 33 through an opening 80, FIG. 2, formed therein, the second lever 42 terminates in a pawl 79 movable into and out of engagement with the ratchet teeth 40 on the inertia member 35 of the webbing sensor mechanism 30.

Upon pivotal movement of the sensor weight 76 in any direction in the event of vehicle acceleration in excess of the predetermined limit, the first lever 77 turns counterclockwise, as viewed in FIG. 2, thereby pivoting the second lever 42 clockwise. The result is the positive engagement of the pawl 79 of the second lever with one of the ratchet teeth 40 on the inertia member 35. Thereupon the webbing sensor mechanism 30 operates just as in the event of rapid webbing extension to cause the locking mechanism 18 to arrest the rotation of the reel 17 in the direction of webbing extension.

In designing the vehicle sensor mechanism 41, particular attention should be paid to the relative lever arms of the two levers 42 and 77. They should be so determined that the slight displacement of the sensor weight 76 may be magnified into the required movement of the pawl 79 into and out of engagement with the ratchet-toothed inertia member 35.

Operation

Although the operation of the illustrated emergency locking retractor is believed to be largely apparent from the foregoing, some amplification will be made in the following brief summary of such operation. When the webbing W is being withdrawn from the retractor at a normal rate, the cam disc 31 and inertia member 35 of the webbing sensor mechanism 30 rotate jointly with the cogwheel 23 and locking ring 25 of the locking mechanism 18. The inertia member 35 exerts no great drag or pull on the projection 47 on the sensor arm 44, allowing same to stay in the solid-line retracted position of FIG. 2 under the bias of the linear spring 49. Thus the cam follower lugs 29 on the locking ring 25 remain engaged in the deepest parts of the notches 32 in the cam disc 31, with the locking teeth 24 held out of engagement with the stationary teeth 21 on the frame 11 and the rotary teeth 22 on the cogwheel 23. The reel 17 is therefore free to rotate.

Upon rapid extension of the webbing W in the event of an emergency, the heavier inertia member 35 becomes unable to follow the cam disc 31 owing to inertia. Consequently, as the sensor arm 44 starts revolving counterclockwise, as viewed in FIG. 2, with the cam disc 31 about the axis of the latter, the projection 47 on one end of the sensor arm receives a drag from the inertia member 35. Thereupon the sensor arm 44 turns clockwise about its own pivot 45 from the solid-line retracted position to the phantom working position against the force of the spring 49. The consequent engagement of the sensor arm pawl 48 with one of the internal ratchet teeth 34 on the sensor housing 33 sets the cam disc 31 out of rotation in the direction of webbing extension.

Being loose on the reel shaft extension 12, the cam disc 31 does not immediately arrest the rotation of the reel 17. As the cogwheel 23 remains in rotation after the cam disc 31 has come to a stop as above, so does the locking ring 25 which is connected to the cogwheel via the spring 26. The cam follower lugs 29 on the revolving locking ring 25 slide over the sloping sides of the notches 32 in the now-fixed cam disc 31. Thereupon the locking ring 25 travels axially toward the cogwheel 23 against the force of the spring 26 until the locking teeth 24 thereon become engaged with the stationary teeth 21 on the frame 11 and the rotary teeth 22 on the cogwheel 23. Now is the retractor locked up.

The illustrated retractor also responds to abrupt changes in vehicle speed. When the vehicle is subjected to an acceleration of more than 0.3 G, for example, the sensor weight 76 of the vehicle sensor mechanism 41 becomes tilted and so pushes up the first lever 77, which in turn pushes up the second lever 42. The result is the engagement of the pawl 79 of the second lever with one of the ratchet teeth 40 on the inertia member 35. As the inertia member is thus locked against rotation in the direction of webbing extension, the webbing sensor mechanism 30 operates in essentially the same way as in the event of rapid webbing extension to cause the locking mechanism 18 to lockup the reel 17.

The retractor is self-unlocking. When the vehicle comes to a stop or resumes travel with no excessive change in speed, the sensor weight 76 of the vehicle sensor mechanism 41 regains an upstanding attitude thereby allowing the pawl 79 of the second lever 42 to disengage the inertia member 35 of the webbing sensor mechanism 30. The released inertia member permits the sensor arm 44 to return to the retracted position under the force of the spring 49. Thus the cam disc 31 becomes free to rotate relative to the reel shaft extension 12 and to the frame 11. Since then the rotary teeth 22 on the cogwheel 23 exert no great torque on the locking teeth 24 engaged therewith and with the stationary teeth 21, the locking ring 25 travels axially back to the normal position under the bias of the spring 26.

With the locking teeth 24 on the locking ring 25 thus disengaged from the stationary 21 and rotary 22 teeth, the reel 17 becomes free to rotate again in either direction. The cam follower lugs 29 on the locking ring become received in the deepest parts of the notches 32 in the cam disc 31 upon disengagement of the locking teeth 24 from the stationary 21 and rotary 22 teeth. The webbing sensor mechanism 30 and the vehicle sensor mechanism 41 are now also in their initial states, ready to activate the locking mechanism 18 whenever required.

The lockup prevention mechanism 58 of FIG. 2 functions as aforesaid to hold the sensor arm 44 in the solid-line retracted position on the cam disc 31 at the time of webbing retraction. During the rotation of the cam disc in the direction of webbing retraction the lockup preventer 59 has its tip 63 sprung into frictional contact with the blank inside surface portion 62 of the sensor housing 33 and is thus urged in a counterclockwise direction about its pivot 60. Accordingly the arm 64 of the lockup preventer positively engages the tongue 50 on the sensor arm 44 in its retracted position. It is thus seen that the sensor arm 44 remains in the retracted position during, and at the end of, webbing retraction.

As the webbing W subsequently receives a pull in the direction of extension, the lockup preventer 59 is pivoted clockwise by the frictional force exerted on its tip 63 from the sensor housing 33. Then the arm 64 of the lockup preventer disengages the sensor arm 44 thereby setting same free to pivot to the phantom working position as required. It will have been appreciated that the lockup prevention mechanism 58 makes possible the smooth re-extension of the webbing after its full retraction, without in any way adversely affecting the performance of the emergency locking retractor.

Modifications

Figure 12:
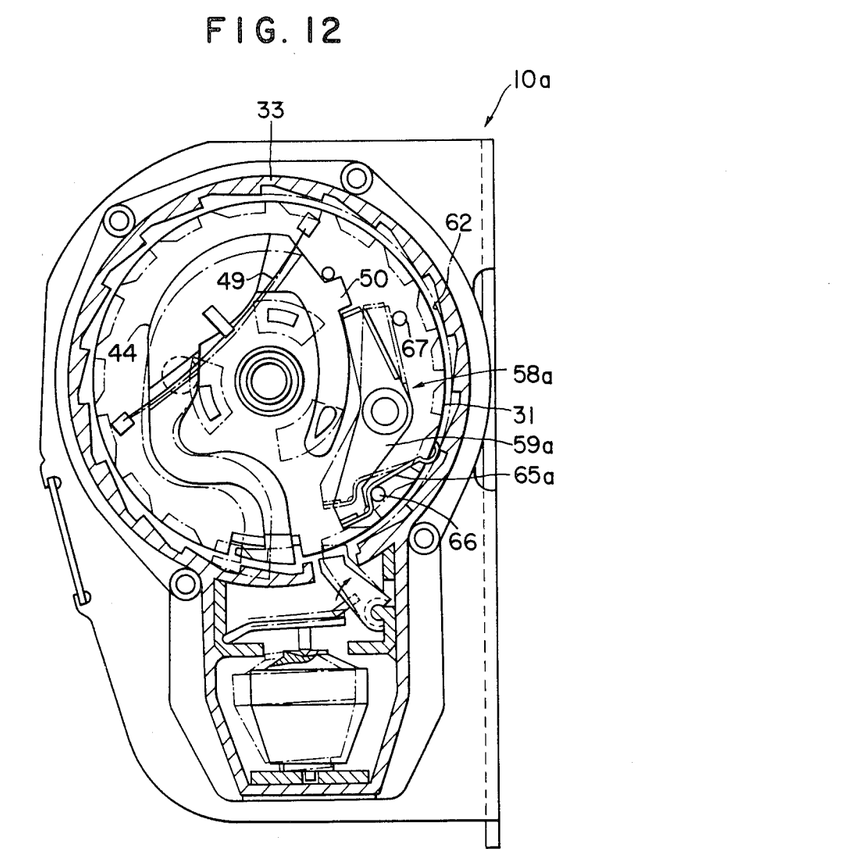
FIG. 12 is a view similar to FIG. 2 but showing an alternative embodiment of the invention.

FIG. 12 shows another emergency locking retractor 10a constructed in accordance with the invention, incorporating a modified lockup prevention mechanism 58a. The modified lockup prevention mechanism features a lever 59a medially pivoted in an eccentric position on the outer face of the cam disc 31.

Figure 13:
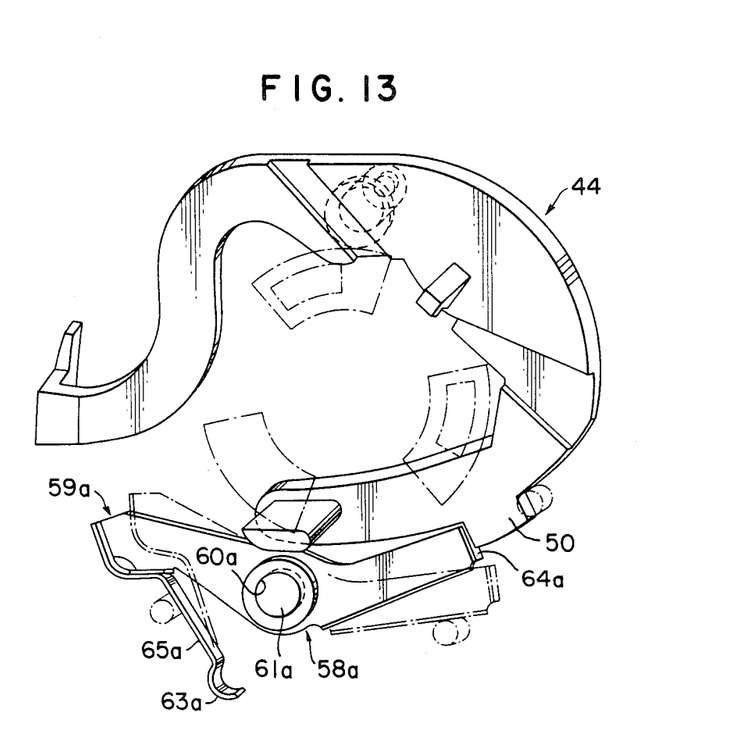
FIG. 13 is an enlarged perspective view of the sensor arm and lockup preventer, shown in their relative working positions, in the embodiment of FIG. 12.
Figure 14:
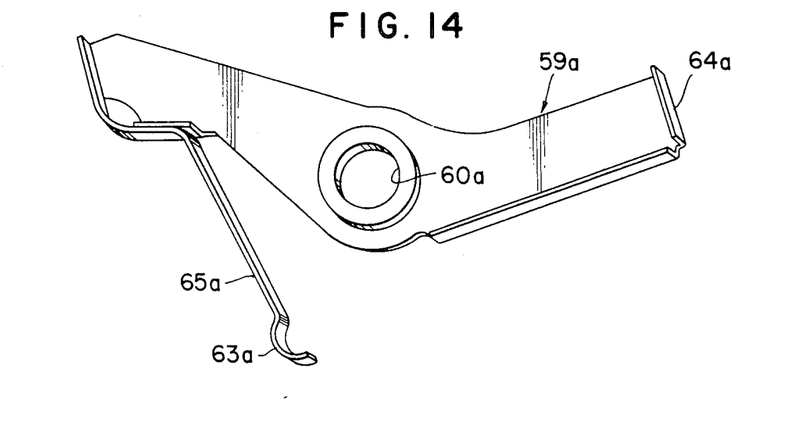
FIG. 14 is a perspective view, drawn on a still more enlarged scale, of the lockup preventer of FIG. 13.

As illustrated in greater detail in FIGS. 13 and 14, the lockup preventer lever 59a has a hole 60a formed therein for rotatably receiving a pivot pin 61a disposed eccentrically on the cam disc, although a pivot pin formed on the lever could be received in an eccentric hole in the cam disc as in the preceding embodiment. Molded from sheet metal or plastic material, the lockup preventer lever 59a integrally includes a cantilever spring 65a extending from one of its opposite ends and terminating in an arcuately curved tip 63a for sliding contact with the blank inside surface portion 62 of the sensor housing 33. The other end 64a of the lockup preventer lever 59a is arranged for movement into and out of positive engagement with the tongue 50 of the sensor arm 44. This end 64a of the lever, as well as its oppositely directed arms, has its marginal edge bent right-angularly by way of reinforcement.

With reference back to FIG. 12 the cantilever spring 65a extends from the lockup preventer lever 59a into frictional engagement with the sensor housing 33 at such an angle to the radial direction of the cam disc 31 that the end 64a of the lever engages the sensor arm tongue 50 only during the rotation of the cam disc in the direction of webbing retraction. The sensor arm 44 is thus retained in the retracted position during, and at the end of, the retraction of the webbing. The pin 66 on the cam disc 31 engages the cantilever spring 65a to limit the counterclockwise movement of the lockup preventer lever 59a during webbing retraction.

During the extension of the webbing, on the other hand, the cantilever spring 65a in sliding contact with the sensor housing 33 causes the lockup preventer lever 59a to pivot clockwise into abutment against the other stop pin 67 on the cam disc 31. Now the lockup preventer lever 59a is out of engagement with the sensor arm tongue 50, so that the sensor arm 44 is free to move to the working position, as required, only against the force of the spring 49.

Figure 15:
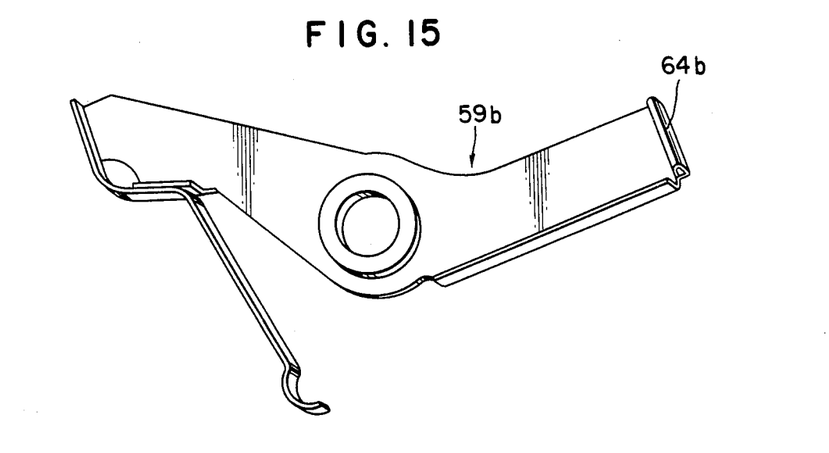
FIG. 15 is a view similar to FIG. 14 but showing a further preferable form of the lockup preventer.

FIG. 15 shows a further modified lockup preventer lever 59a. The modification resides in the end 64b of the lever, intended for engagement with the sensor arm tongue, which is folded twice into triangular cross sectional shape by way of reinforcement.

Figure 16:
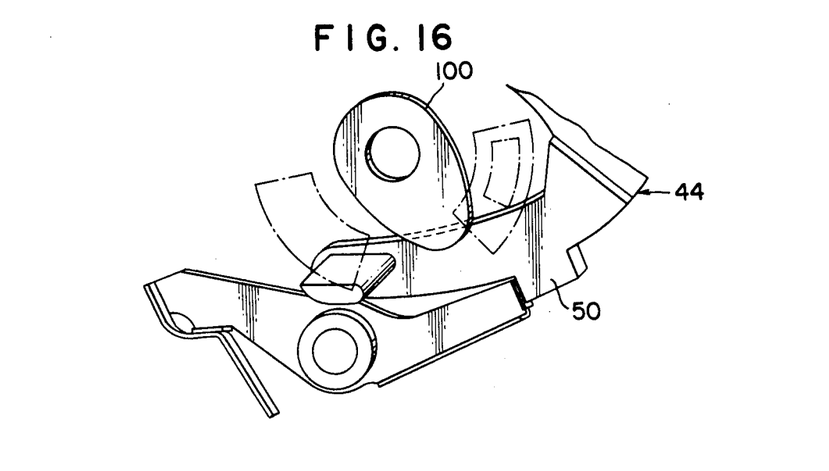
FIG. 16 is a fragmentary perspective view somewhat similar to FIG. 13 but additionally showing a retainer or guide for holding the sensor arm in a preassigned working plane.

In FIG. 16 is shown a retainer or guide 100 suitably mounted on the cam disc or on the reel shaft extension and slidably engaging the sensor arm 44. The retainer 100 is intended to prevent the displacement, away from the cam disc, of the part of the sensor arm in the vicinity of the tongue 50.

The following is a brief list of additional modifications that will occur to one skilled in the art on the basis of this disclosure:

1. The vehicle sensor mechanism, if to be incorporated in retractors constructed in accordance with the invention, need not be of the illustrated type having a weight pivotable on its bottom. Other adoptable types include those having a weight suspended in a pendulum fashion, and a ball rollable on a conical surface.
2. If the sensor housing is molded from plastics material, it may be provided with a metal lining for relative sliding contact with the lockup preventer, in order to extend the useful life of the retractor.

All these and other modifications or variations of this invention are intended in the foregoing disclosure. The invention should therefore be construed broadly and in a manner consistent with the fair meaning or proper scope of the following claims.

What is claimed is:

1. An emergency locking retractor for a seat belt assembly wherein a reel for paying off and winding up webbing is fixedly mounted on a reel shaft which is rotatably mounted to a frame having side walls and which is spring energized in a direction to cause retraction of the webbing, said shaft having an extension extending beyond a side wall of the frame, the retractor comprising:

(a) a locking mechanism for locking the reel against rotation comprising:
      (1) a set of teeth formed in annular arrangement on an outer surface of a sidewall of the frame concentrically surrounding the reel shaft extension;
      (2) a cogwheel fixedly mounted on said extension of the reel shaft and having a set of cogs capable of radial alignment with said teeth on the frame;
      (3) a locking ring concentrically surrounding the reel shaft extension and having cam follower means for axial movement toward and away from the cogwheel, the locking ring having locking teeth engageable with said cogs of said cog wheel, and said teeth on the frame and being adapted to lock the cogwheel, and therefore the reel, against rotation relative to the frame when moved toward the cogwheel; and
      (4) first resilient means between the cogwheel and the locking ring to impart the rotation of the former to the latter, the first resilient means yieldably urging the locking ring away from the cogwheel;

(b) a webbing sensor mechanism for causing the locking mechanism to lock the reel against rotation in response to the extension of the webbing at a rate in excess of a predetermined limit, the webbing sensor mechanism comprising:
      (1) a cam disc rotatably mounted on the reel shaft extension and normally engaged with the cam follower means of the locking ring for joint rotation therewith, the cam disc being effective, when locked against rotation relative to the frame in a direction of webbing extension, to cause the locking ring to move toward the cogwheel against the bias of the first resilient means and hence to cause the locking ring to arrest the rotation of the reel;
      (2) a curved sensor arm medially pivoted in an eccentric position on an outer face of the cam disc for movement between a retracted and a working position, the sensor arm being adapted to pivot from the retracted to the working position upon exertion of a force on its first end tending to arrest the revolution of the sensor arm with the cam disc in the direction of webbing extension;

(3) a pawl at a second end of the sensor arm which projects beyond the circumference of the cam disc upon pivotal movement of the sensor arm to the working position;

(4) second resilient means comprising a linear spring biasing the sensor arm from the working toward the retracted position;

(5) an annular member mounted in fixed relation to the frame and concentrically surrounding the reel shaft extension, the annular member having a set of internal ratchet teeth; and (6) an inertia member rotatably mounted on the reel shaft extension and operatively engaged with at least the first end of the sensor arm so as to be free to rotate relative to the sensor arm and the cam disc within limits, the inertia member having a greater mass than the combined mass of the cam disc and the sensor arm whereby upon rapid rotation of the reel due to the extension of the webbing at a rate in excess of the predetermined limit, the inertia member lags behind the cam disc thereby relatively acting on the first end of the sensor arm to cause same to pivot from the retracted to the working position against the bias of the second resilient means.

2. The emergency locking retractor as recited in claim 1, wherein the second resilient means of the webbing sensor mechanism comprises a linear spring supported at both extremities thereof on said one face of the cam disc and engaged at a midpoint thereof with the sensor arm.

3. The emergency locking retractor as recited in claim 1, wherein the sensor arm of the webbing sensor mechanism is of a reinforced plastic.

4. The emergency locking retractor as recited in claim 1, wherein the annular member forms part of a housing attached to the frame so as to enclose the locking mechanism and the webbing sensor mechanism.

5. The emergency locking retractor as recited in claim 1, wherein the inertia member of the webbing sensor mechanism has formed therein an arcuate slot, centered about the axis of the reel shaft extension, for loosely receiving a projection on the first end of the sensor arm, and at least one other arcuate slot, also centered about the axis of the reel shaft extension, for loosely receiving another projection on said one face of the cam disc.

6. The emergency locking retractor as recited in claim 1, further comprising a vehicle sensor mechanism for causing the locking mechanism to lock the reel against rotation in response to the acceleration of a vehicle in which the retractor is installed, at a rate in excess of a predetermined limit.

7. The emergency locking retractor as recited in claim 6, wherein the inertia member of the webbing sensor mechanism is in the form of a ratchet wheel, and wherein the vehicle sensor mechanism acts on the inertia member to lock same against rotation in the direction of webbing extension upon vehicle acceleration in excess of the predetermined limit.

8. An emergency locking retractor for a seat belt assembly wherein a reel for paying off and winding up webbing is fixedly mounted on a reel shaft which is rotatably mounted to a frame and which is spring energized in a direction to cause retraction of the webbing, the retractor comprising:

(a) a locking mechanism for locking the reel against rotation comprising:

(1) a cogwheel fixedly mounted on an extension of the reel shaft;

(2) a locking ring concentrically surrounding the reel shaft extension and having cam follower means for axial movement toward and away from the cogwheel, the locking ring being adapted to lock the cogwheel, and therefore the reel, against rotation relative to the frame when moved toward the cogwheel; and (3) first resilient means connected between the cogwheel and the locking ring to impart the rotation of the former to the latter, the first resilient means yieldably urging the locking ring away from the cogwheel;

(b) a webbing sensor mechanism for causing the locking mechanism to lock the reel against rotation in response to the extension of the webbing at a rate in excess of a predetermined limit, the webbing sensor mechanism comprising:

(1) a cam disc rotatably mounted on the reel shaft extension and normally engaged with the cam follower means of the locking ring for joint rotation therewith, the cam disc being effective, when locked against rotation relative to the frame in a direction of webbing extension, to cause the locking ring to move toward the cogwheel against the bias of the first resilient means and hence to cause the locking ring to arrest the rotation of the reel;

(2) a curved sensor arm medially pivoted in an eccentric position on an outer face of the cam disc for movement between a retracted and a working position, the sensor arm being adapted to pivot from the retracted to the working position upon exertion of a force on its first end tending to arrest the revolution of the sensor arm with the cam disc in the direction of webbing extension;

(3) a pawl at a second end of the sensor arm which projects beyond the circumference of the cam disc upon pivotal movement of the sensor arm to the working position;

(4) second resilient means biasing the sensor arm from the working toward the retracted position;

(5) an annular member mounted in fixed relation to the frame and concentrically surrounding the reel shaft extension, the annular member having a set of internal ratchet teeth to be engaged by the pawl of the sensor arm upon pivotal movement thereof to the working position against the bias of the second resilient means, the cam disc being locked against the rotation in the direction of webbing extension upon engagement of the pawl with one of the internal ratchet teeth; and (6) an inertia member rotatably mounted on the reel shaft extension and operatively engaged with at least the first end of the sensor arm so as to be free to rotate relative to the sensor arm and the cam disc within limits, the inertia member having a greater mass than the combined mass of the cam disc and the sensor arm whereby upon rapid rotation of the reel due to the extension of the webbing at a rate in excess of the predetermined limit, the inertia member lags behind the cam disc thereby relatively acting on the first end of the sensor arm to cause same to pivot from the retracted to the working position against the bias of the second resilient means; and (c) a lockup prevention mechanism for maintaining the sensor arm in the retracted position during, and at the end of, the retraction of the webbing by the force of the spring in order to make possible the smooth re-extension of the webbing.

9. The emergency locking retractor as recited in claim 8, wherein the annular member of the webbing sensor mechanism is formed to include a blank inside surface portion, and wherein the lockup prevention mechanism comprises a lockup preventer pivotally mounted on said one face of the cam disc and having a tip capable of sliding engagement with the blank inside surface portion of the annular member so as to be oriented in different directions on the cam disc during the rotation of the reel in the direction of webbing extension and in the direction of webbing retraction, the lockup preventer being further adapted to engage and retain the sensor arm in the retracted position during, and at the end of, the rotation of the reel in the direction of webbing retraction.

10. The emergency locking retractor as recited in claim 9, wherein the lockup prevention mechanism further comprises a pair of stops formed on said one face of the cam disc to limit the pivotal movement of the lockup preventer thereon.

11. The emergency locking retractor as recited in claim 9, wherein the lockup preventer of the lockup prevention mechanism is formed to include a spring portion thereby to be self-biased to maintain the tip thereof in proper frictional engagement with the blank inside surface portion of the annular member.

12. The emergency locking retractor as recited in claim 11, wherein the spring portion of the lockup preventer is formed by a pair of opposed U-shaped parts located between the tip of the lockup preventer and a pivot thereof on the cam disc.

13. The emergency locking retractor as recited in claim 8, wherein the annular member of the webbing sensor mechanism is formed to include a blank inside surface portion, and wherein the lockup prevention mechanism comprises:

(a) a lockup preventer lever medially pivoted on said one face of the cam disc and having a first end movable into and out of engagement with the sensor arm, the lockup preventer lever being effective to maintain the sensor arm in the retracted position during engagement therewith; and (b) a cantilever spring extending from a second end of the lockup preventer lever into sliding engagement with the blank inside surface portion of the annular member, the cantilever spring being oriented at such an angle to the radial direction of the cam disc that the first end of the lockup preventer lever is moved into engagement with the sensor arm only during the rotation of the reel in the direction of webbing retraction.

14. The emergency locking retractor as recited in claim 13, wherein the lockup prevention mechanism further comprises a pair of stops formed on said one face of the cam disc to limit the pivotal movement of the lockup preventer lever.

15. The emergency locking retractor as recited in claim 13, wherein the lockup preventer lever and the cantilever spring of the lockup prevention mechanism are integral with each other.

* * * * *